United States Patent [19]
Aucsmith

[11] Patent Number: 5,712,800
[45] Date of Patent: Jan. 27, 1998

[54] BROADCAST KEY DISTRIBUTION APPARATUS AND METHOD USING CHINESE REMAINDER

[75] Inventor: David W. Aucsmith, Portland, Oreg.

[73] Assignee: Intel Corporation, Santa Clara, Calif.

[21] Appl. No.: 779,138

[22] Filed: Jan. 6, 1997

Related U.S. Application Data

[63] Continuation of Ser. No. 310,845, Sep. 22, 1994.
[51] Int. Cl.$^6$ ................................................ G09C 1/00
[52] U.S. Cl. ........................... 364/514 R; 380/30; 380/44
[58] Field of Search ..................... 364/514 R; 341/173; 380/21, 28, 30, 44; 395/186, 187.01, 188.01

[56] References Cited

PUBLICATIONS

"Elementary Number Theory and Its Applications", Kenneth H. Rosen, AT&T Information Systems Laboratories, pp. 107–112, 1985.

*Primary Examiner*—Ellis B. Ramirez
*Assistant Examiner*—Thomas Peeso
*Attorney, Agent, or Firm*—Blakely, Sokoloff, Taylor & Zafman

[57] ABSTRACT

A communication system utilizing low bandwidth requirements for transmitting an encoded value formulated using the Chinese Remainder procedure to receivers having a private key. The system offers the advantages of low bandwidth transmission of single standard key systems but the security of private key systems. Each receiver contains a private key and a prime number associated with the receiver. The transmitter system utilizes the Chinese Remainder procedure and the private key and the prime number associated with each receiver to generate a unique value X that solves a particular set of relationships for a set of authorized receivers of the communication network and no others. The value X is broadcast to all receivers and each receiver utilizes its prime number and its private decryption key to arrive at a master key. Unauthorized receivers will not obtain a valid master key because their prime numbers are outside of the set relationships that X solves. By broadcasting only X, the system avoids the requirement of broadcasting a separate encoded version of the master key to each authorized receiver. The system may be used to also broadcast new private keys to the receivers or a subset of receivers within the network.

7 Claims, 10 Drawing Sheets

BROADCAST KEY DISTRIBUTION APPARATUS AND METHOD USING CHINESE REMAINDER

This is a continuation of application Ser. No. 08/310,845, filed Sep. 22, 1994.

BACKGROUND OF THE INVENTION

(1) Field of the Invention

The present invention relates to the field of communication technology. More specifically, the present invention relates to the field of encoding and decoding of communication information.

(2) Prior Art

In many systems there are often a group of information receiver stations that are coupled to receive messages from a central transmitter or station. This arrangement can exist in conjunction with a number of different communication technologies, such as cable video, cable TV, computer/network communication, telephone, wireless beepers, pagers and others. As with most utilities, typically the information transmitter offers several different receiver subscription levels that limit information reception for some receivers or, alternatively, the transmitter may desire to transmit special messages to only a select group of authorized receivers. However, in order to reduce the complexity of distributing information to the receivers, all receivers within a given network are typically coupled to, or receive information from, a common distribution cable or network communication bus. Therefore, some encoding procedure is required to discriminate among a select group of arbitrary receivers.

There arises the need for the capability to transmit certain messages such that only a subset (e.g., G) of the receivers of any particular network are able to receive certain messages and the other receivers do not. This is accomplished by transmitting messages in coded form using an encryption code that is known by the transmitter and only those authorized receivers that should validly receive the message. A uniform encryption key can be given between the transmitter (or source station) and the authorized receivers. This is a single standard key system. However, unauthorized receivers may pick up the standard key and then may be able to receive the message. Therefore, if a uniform or standard encryption key is used, it can be readily broken by unauthorized receivers. Although a valid mechanism in which to encrypt messages, the uniform or standard encryption key system is not desirable.

Other prior art methods of solving this problem utilize a separate or private encryption key for each authorized receiver within the network. Using this technique, the transmitter is aware of each private key and the standard or uniform key is broadcast in an encoded form, separately, to each authorized receiver. The authorized receiver then decodes the standard key, using its private key, and obtains the standard key or code by which it can decode the message. Although this method reduces the chances that an unauthorized receiver will receive the message (because the standard key is encoded), it unfortunately requires a transmission of a separate encoded standard key for each authorized receiver before the transmission of the message. This type of system is not practical in systems having large numbers of users, such as a cable video or TV system having hundreds of thousands of receivers, because the bandwidth required to communicate each encoded standard key to each receiver is too large. Further, in these systems, for security reasons, it is often desirable to alter or modify the private key for each receiver. Using the above system requires high bandwidth transmission in order to alter the private keys and a separate transmission is required for each authorized receiver.

FIG. 1 illustrates a typical procedure 50 utilized by these prior art systems that utilize the private key system as discussed above. The procedure 50 begins at 52 and flows to 54 where the transmitter generates and transmits a private encryption key, k(i), to each unit within the system. This step may be performed when the receivers are assembled before they are inserted into the communication network. In any case, at 54, a private key is given to each receiver and each private key is recorded in memory at the transmitter site. At 56, the transmitter generates a master encryption key, K, for all units and stores this standard key, K, into memory. The key, K, may be generated by a number of procedures, including random or arbitrary generation.

At 58, the transmitter encrypts key, K, a separate time using each private key, k(i), in order to generate a separate encrypted master key, K'(i), for each individual authorized receiver of the selected group of receivers (G). For instance:

$$K'(i) = E_{k(i)}(K)$$

Where $E_{k(i)}(K)$ is the Encryption of K by individual private key k(i).

Also, at 58, each K'(i) is transmitted separately over the communication network (to all receivers) with the address of its associated receiver. This step requires a large bandwidth transmission because each authorized receiver must have a separate transmission performed. At 60, each receiver uses its private key, k(i), to decrypt its associated K'(i) in order to obtain the standard key, K, which it stores. Each authorized receiver (the set G) would obtain a valid K. Receivers outside of G would not receive a valid K. Since they would not receive an encoded K'(i) that they could decode. For instance:

$$K = D_{k(i)}(K'(i))$$

Where $D_{k(i)}(K'(i))$ is the Decryption of K'(i) by private key k(i)

At 62, the transmitter encrypts a message, M, using the standard key, K, and broadcasts the encrypted message, C, to all users. At 64, each authorized receiver (e.g., the set of G), having a valid K, will decrypt the message C to obtain the message M and will process the message M in conventional methods. Those receivers not in G would not have a valid K and therefore would not be able to obtain M. Although valid, the prior art process 50 is not desirable because of the large bandwidth requirements of block 58.

What is needed is system that offers the protection and security level of a system having private keys for each receiver, but offers the low bandwidth requirements of a single standard key system. The present invention offers such advantageous functionality.

Accordingly, it is an object of the present invention to provide efficient broadcast and reception of messages to a selected subset, G, of receivers of a larger group of receivers within a communication network. It is an object of the present invention to provide such efficient broadcast using low bandwidth requirements but also allowing use of private keys for each receiver. Therefore, it is an object of the present invention to provide the security level offered by private key systems while maintaining the low bandwidth requirements of a single standard key system. It is also an object of the present invention to provide a low bandwidth requirement mechanism for broadcasting replacement private keys to all receivers within a network or a select subset of receivers. These and other objects not specifically mentioned, but that are clear within discussions of the present invention, will be discussed to follow.

SUMMARY OF THE INVENTION

A communication system utilizing low bandwidth requirements for transmitting an encoded value formulated using the Chinese Remainder procedure to receivers having a private key is described. The system offers the advantages of low bandwidth transmission of single standard key systems but the security of private key systems. Each receiver contains a private key and a prime number associated with the receiver. The transmitter system utilizes the Chinese Remainder procedure and the private key and the prime number associated with each receiver to generate a unique value X that solves a particular set of relationships for a set of authorized receivers of the communication network and no others. The value X is broadcast to all receivers and each receiver utilizes its prime number and its private decryption key to arrive at a master key. Unauthorized receivers will not obtain a valid master key because their prime numbers are outside of the set relationships that X solves. By broadcasting only X, the system avoids the requirement of broadcasting a separate encoded version of the master key to each authorized receiver. The system may be used to also broadcast new private keys to the receivers or a subset of receivers within the network.

An embodiment of the present invention includes an apparatus for performing network communication, the apparatus including: a plurality of receiver units individually having a prime value and a private key; transmitter processing logic for selecting a subset of the plurality of receiver units and for individually encrypting a master key, K, with each private key of the subset of receiver units; wherein the transmitter processing logic is also for solving a set of relationships that contain values associated with the subset of receiver units wherein a single value, X, solves each relationship; and broadcast processing logic coupled to communicate with the transmitter processing logic for transmitting the single value, X, to each receiver unit of the plurality of receiver units wherein the transmitter processing logic encrypts the master key, K, with each private key of the subset of receiver units to generate an encrypted master key for each receiver unit of the subset and wherein the set of relationships includes an individual prime value, an individual encrypted master key, and the single value X for each receiver unit of the subset.

Embodiments of the present invention include the above and wherein the transmitter processing logic utilizes the Chinese Remainder procedure to solve the set of relationships to determine the single value X and wherein the set of relationships associated with the subset comprise:

$$K'(i)=X\bmod(p(i)) \ (i-1 \text{ to } n),$$

wherein n is the number of receiver units within the subset, p(i) is the prime value for a receiver unit, i, of the subset and K'(i) is the encrypted master key of the receiver unit, i of the subset.

Embodiments of the present invention include the above and wherein an individual receiver unit of the plurality of receiver units includes: receiver processing logic for receiving the single value, X, from the broadcast processing logic; computation processing logic for computing an encrypted master key associated with the individual receiver unit, the encrypted master key computed based on a prime value and a private key associated with the individual receiver unit; and key decryption processing logic for decrypting the encrypted master key of the individual receiver unit based on the private key of the individual receiver unit to obtain the master key, K and wherein the computation processing logic computes the encrypted master key according to:

$$K'(i)=X\bmod(p(i)),$$

wherein K'(i) is the encrypted master key for the individual receiver unit, i, and p(i) is the prime value for the individual receiver unit, i.

DETAILED DESCRIPTION OF THE INVENTION

Figure 1:
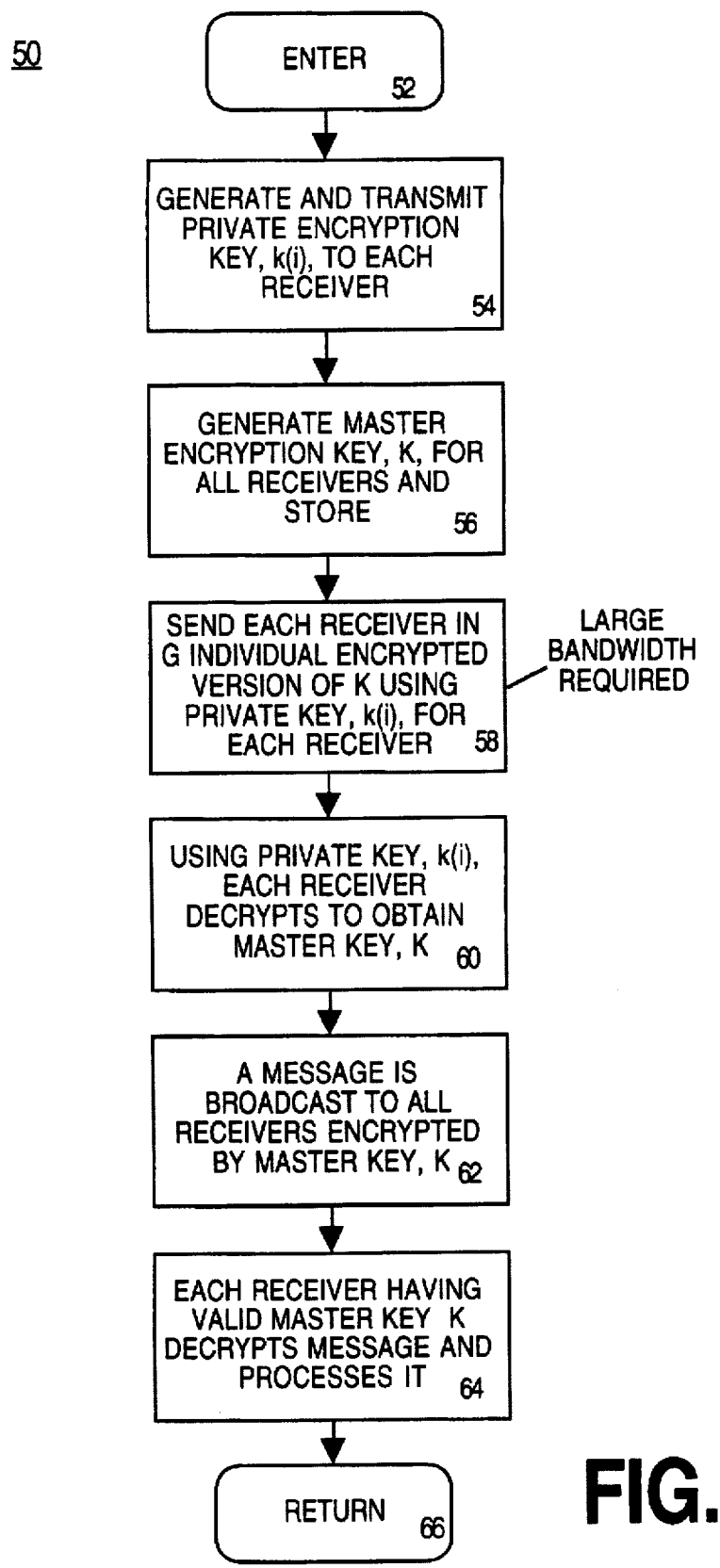
FIG. 1 illustrates a flow chart of a prior art private key system having a high bandwidth requirement.

The present invention includes an apparatus and method for broadcasting information to an arbitrary subset of users (G) of a communication network in a way that only that subset, G, and no other users (receivers) may interpret the message. The present invention performs the above uniquely in that the system uses only one broadcast decryption key that solves a unique set of relationships attributed to an authorized subset of receivers. The subset of receivers may be varied at any time and the message may be of any form of data. The general applicability of the present invention system allows it to be advantageously used over a host of communication systems, such as local or wide area networks, cable television, video systems, beepers and pager systems for instance.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, routines, elements, and circuits have not been described in detail as not to unnecessarily obscure the present invention.

NOMENCLATURE

Some portions of the detailed descriptions which follow are presented in terms of algorithms and symbolic representations of operations on data signals or bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, optical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical signals or quantities and are merely convenient labels applied to these quantities. Unless specifically stated otherwise, as apparent from the following discussions, it is appreciated that throughout the present invention, discussions utilizing terms such as "processing" or "obtaining" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention relate to broadcast transmission and reception of encoded messages. This apparatus may be specially constructed for the required purposes, or it may comprise a general purpose computer (see below) selectively activated or reconfigured by a computer program stored in a computer embedded in a transmitter or receiver unit. The procedures presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not limited with reference to any particular programming language although an exemplary language maybe used herein. It will be appreciated that a variety of programming languages may be used to implement the teachings of the present invention as described herein.

COMPUTER SYSTEM

Figure 2:
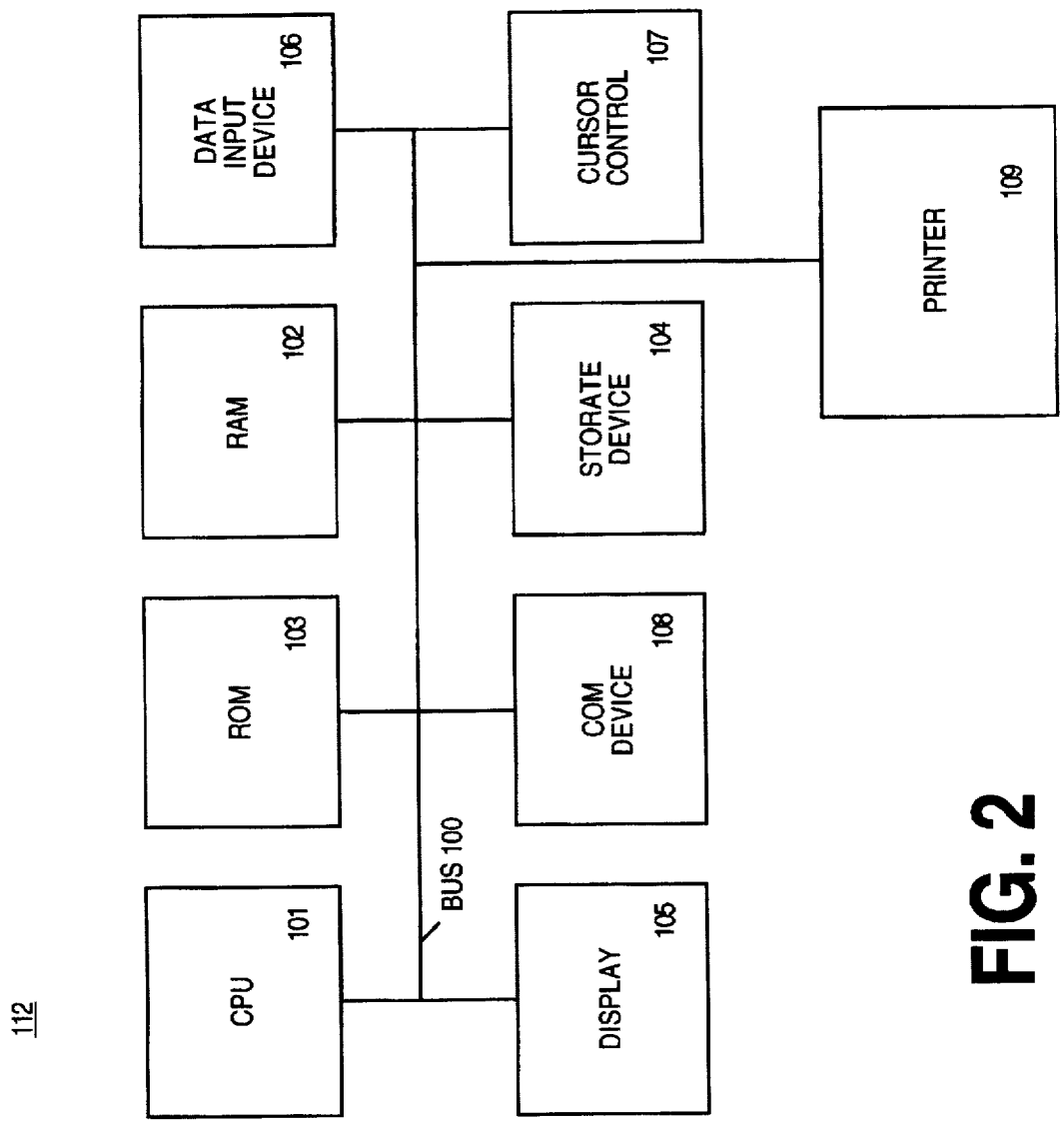
FIG. 2 illustrates a computer system capable of implementing aspects of the present invention broadcast key distribution system.

To this end, aspects of the present invention may be implemented within a general purpose computer system as shown in FIG. 2. FIG. 2 illustrates components of a general purpose computer system 112 that are capable of executing procedures of the present invention as described to follow. As discussed herein to follow, the transmitter unit (source) and the receiver units (users) may contain elements of general purpose computer system 112 embedded therein for the implementation of procedures of the present invention. The computer system 1 12 comprises an address/data bus 100 for communicating information within the system, a central processor 101 coupled with the bus 100 for executing instructions and processing information, a random access memory 102 coupled with the bus 100 for storing information and instructions for the central processor 101 a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device ("communication device") 108 coupled to the bus 100 for communicating command selections to the processor 101.

The signal generation device 108 can include a standard RS-232 or similar serial port for communicating with peripherals. A computer or central "chassis" refers to circuitry that may include at least the CPU 101, address/dam bus 100, a portion of ROM 103, and a portion of RAM 102. The core functionality of the computer system 112 of the present invention may be performed by the chassis. In such case the computer system 112 can be an embedded computer system in a larger receiver unit or other communication unit. Alternatively, in some systems the chassis may also include, but not necessarily, the storage device 104 (optionally) and the communication device 108 (optionally). A hardcopy device or printer 109 may also be optionally attached.

The display device 105 of FIG. 2 utilized with the computer system 112 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, finger pad, pen and tablet, mouse, joystick or special keys on the alphanumeric input device 105 capable of signaling movement of a given direction or manner of displacement.

Figure 3:
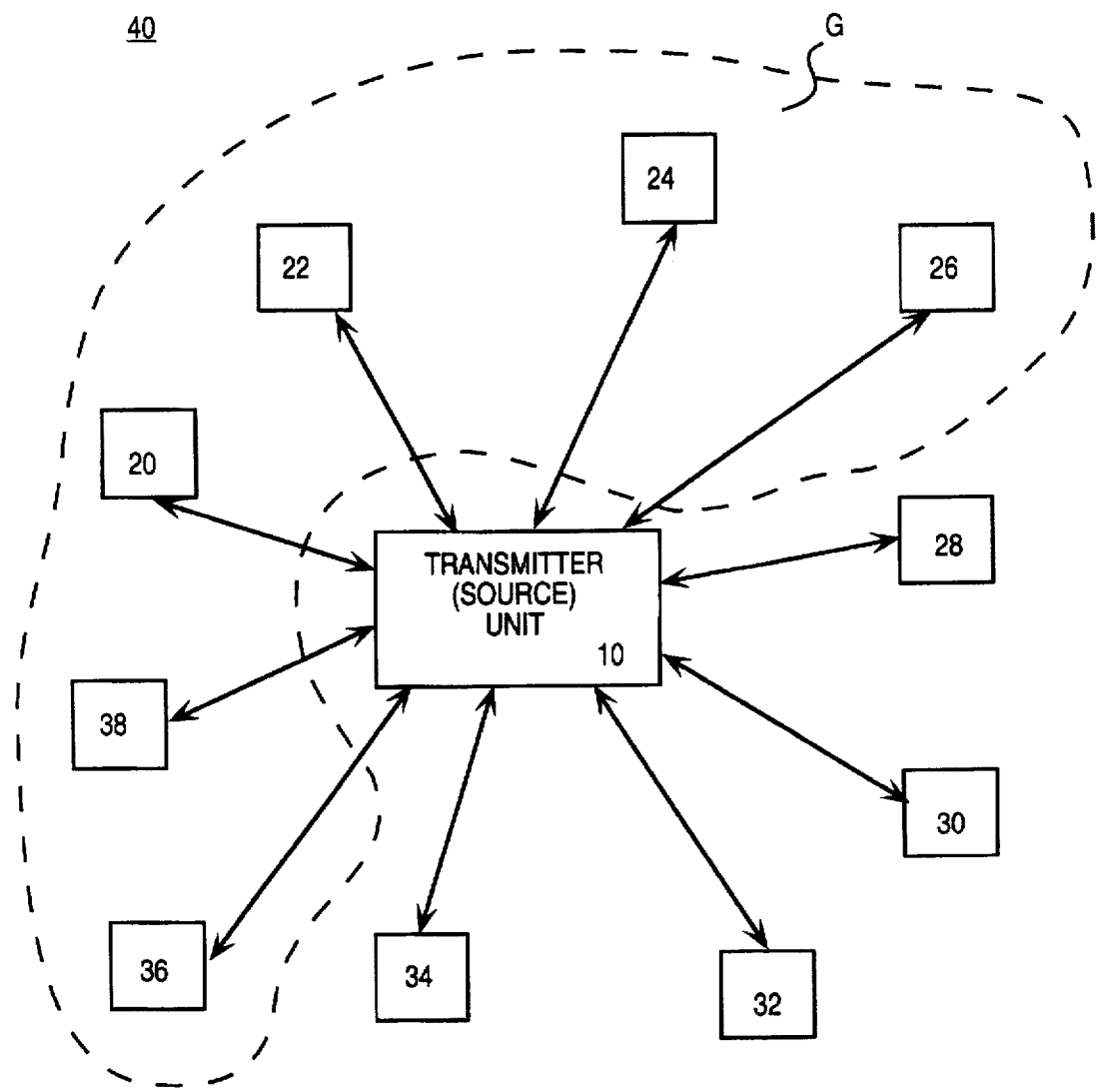
FIG. 3 is an illustration of an exemplary communication network of the present invention having an information transmitter and a selected group G of information receivers.

FIG. 3 illustrates an exemplary communication network 40 of the present invention comprising a transmitter unit 10 or source and a plurality of receiver units 20–38. The network as shown in FIG. 3 may be of a number of communication technologies, such as a local or wide area network, cable TV, cable video, digital or analog, telephone system beeper, and pager system, for example. Elements of the computer system 112 can be implemented within the transmitter 10 and the receivers 20–38 to implement procedures of the present invention.

Among the receiver units 20–38 of FIG. 3 that are coupled to receive information from the transmitter 10 within network 40, there can be defined an arbitrary and variable subset group, G, defined by the transmitter 10 that are designated to receive a particular message or broadcast. The remainder receivers, 28–34, are to be excluded from receiving the message. The "authorized" receivers are then the receivers within the given subset G, The present invention produces an encoding mechanism wherein each receiver 20–38 of network 40 has an associated private key and prime number and this key and prime are used to decode a master encryption key that is broadcast as a single value in coded form to all units 20–38. The procedures of the present invention provide a special encoded number, X, that is used by each receiver to decode the master key. The number, X, is generated by the present invention in such a manner that only receivers of group G will decode a valid master key. The Chinese Remainder procedure is used generate X such that X solves a set of relationships. Since X can be transmitted, instead of a separately encoded master key for each authorized receiver, the bandwidth requirements of the present invention are significantly reduced.

CHINESE REMAINDER PROCEDURE

The present invention utilizes the Chinese Remainder procedure to determine a unique value, X, that solves a number of formulas, each formula associated with a particular authorized receiver and that receiver's associated prime number. Within the present invention it is assumed that each receiver unit of network 40 contains a separate private key, k(i), and also a separate and unique prime number, p(i). According to the present invention, the smallest prime number of the receivers is to be larger than the total number of receivers within the entire network. The prime numbers need not be secret, and they need not be actually prime but rather pair-wise relatively prime. That is, any prime number of p(i) should not be a factor of another prime number within the set of p(i).

The Chinese Remainder procedure is described in detail within a text book entitled *Elementary Number Theory and Its Applications*, by Kenneth H. Rosen, published by Addison-Wesley Publishing Company, 1985, pages 107–112. In this passage, solutions for the Chinese Remainder procedure are discussed related to computer processing. A description of the procedure is given below along with an exemplary implementation of the procedure in the programming language, C. Herein the expression, $$x = A \bmod (B),$$

solves for the number x that gives a remainder of value A when divided by B. For instance, x=157 when A=52 and B=105.

If the prime factorization of n is known, then the Chinese Remainder procedure can be used to solve a whole system of relationships. In general, if the prime factorization of n=p1×p2×...pt, then the system of equations $$(x \bmod p_i) = a_i, \text{ where } i=1, 2, \ldots, t$$

has a unique solution, x, where x is less than n. Some primes can appear more than once, for example, p1 might equal p2. So for an arbitrary a<p and b<q (where p and q are prime), then there exists a unique x, when x is less than p=q, such that $$x \equiv a \pmod{p}, \text{ and } x \equiv b \pmod{q}$$

To find this x, first use Euclid's algorithm to find u, such that:

$$u \times q \equiv 1 \pmod{p}$$

Then compute:

$$x = (((a-b) * u) \bmod p) * q + b$$

The Chinese remainder procedure can be expressed in C as follows in exemplary programs:

```
Program 1:
    /*    r is the number of elements in arrays m and u;
          m is the array of (pairwise relatively prime) moduli
          u is the array of coefficients
          return value is n such than n == u[k] %m[k]   (k=0 .. r-1)
                                       and
                             n < m[0] *m[1]*. . .*m[r-1]
    /*
    int chinese_remainder (size_t r, int *m, int *u)
    {
        size_t i;
        int modulus;
        int n;
        modulus = 1;
        for (i=0; i<r; ++i)
            modulus *= m[i];
        n = 0;
        for (i = 0; i <r; ++i)  {
            n += u [i] * modexp (modulus / m[i], totient (m[i]),
            m[i]);
            n % = modulus;
        }
        return n;
    }
Program 2
Procedure crt (n, p₁, . . . ,Pᵣ, x₁, . . . , xᵣ)
{return x of the set [0, n – 1] such that x mod pᵢ = xᵢ (1 ≤
i ≤ t ) }
begin
    for i := 1 to t   do
              yᵢ := inv    ((n/pᵢ) mod pᵢ, pᵢ );
              x := 0;
    for i := 1 to r   do
              x := [x + (n/pᵢ) * yᵢ * xᵢ] mod n ;
              crt := x
end;
Procedure using the multiplicative inverse theorm:
Procedure inv (a, n)
{Return x such that ax mod n = 1, where 0 < a < n}
begin
    g₀ := n; g₁ := a;
    u₀ := 1; v₀ := 0;
    u₁ := 0; v₁ := 1;
    i := 1;
    while gᵢ ≠ 0 do "gᵢ = uᵢn + vᵢa"
    begin
            y := gᵢ₋₁ div gᵢ;
            gᵢ₊₁ := gᵢ₋₁ – y * gᵢ;
            uᵢ₊₁ := uᵢ₋₁ – y * uᵢ;
            vᵢ₊₁ := vᵢ₋₁ – y * vᵢ;
            i := i + 1
    end;
    x := vᵢ₋₁;
    if x ≥ 0 then inv := x else inv := x + n
end
```

As will be discussed in further detail below, the present invention utilizes the Chinese Remainder procedure to compute a value X that solves a set of formulas associated with an arbitrary subset, G, of receivers within a network, 40. For instance, the transmitter 10 generates a master key, K. Then, the transmitter encodes this key using the private keys k(i) of all receivers in G to generate a separate encoded master key K for each receiver in G. These are designated as K'(i). For instance, $$K'(i) = E_k(i)(K)$$

Since each receiver of group G has its own prime number, p(i), associated with it, the following equations are generated by the present invention transmitter 10 for each authorized receiver in the network 40:

$X = K'(1) \bmod (p(1))$ $X = K'(2) \bmod (p(2))$ $X = K'(3) \bmod (p(3))$ $X = K'(4) \bmod (p(4)) \ldots$ $X = K'(n) \bmod (p(n))$, where n is the number of authorized receivers in network 40. The Chinese Remainder procedure, as shown above, is used by the present invention to compute X. Once X is found, an authorized receiver unit within G can perform the below procedure to obtain K'(i) and from this the master key, K, is obtained using:

$K'(i) = X \bmod (p(i))$ $K = D_{k(i)}(K'(i))$ $M = D_K(C)$

Then K can be used to decrypt the encoded message, C, as shown above. Of course, those receivers not within G will determine an invalid K'(i) and will determine an invalid K. These receivers not in G will not properly decode the message, M.

Since the transmitter 10 of the present invention need only broadcast X, and not each of K'(i), the bandwidth requirements are significantly reduced under the present invention and each receiver has an associated private key and prime that are used to determine the master key K. The master key, K, is not broadcast.

LOGICAL PROCESSING OF THE PRESENT INVENTION FOR MESSAGE TRANSMISSION/ RECEPTION

Figure 4:
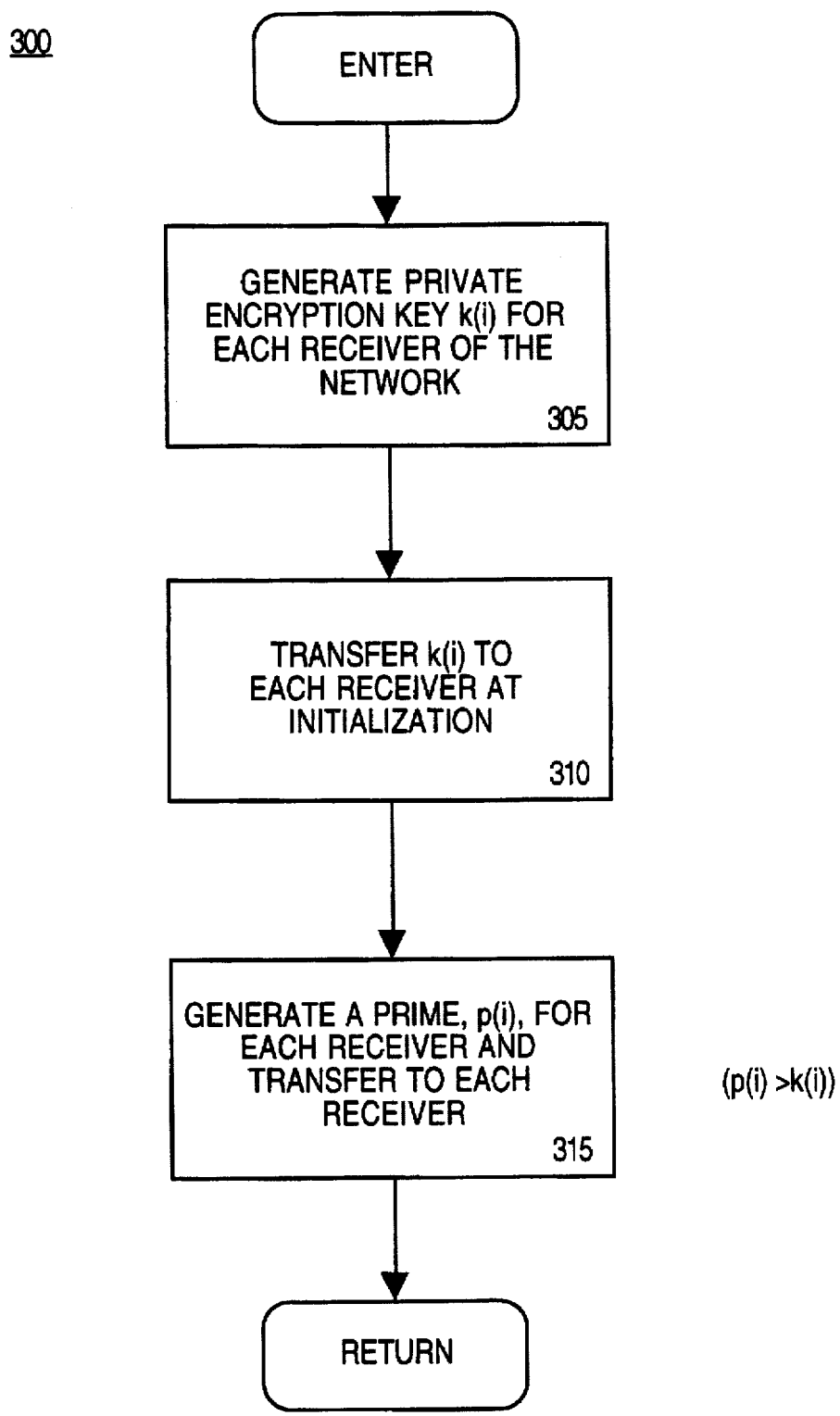
FIG. 4 is a flow diagram illustrating steps of the present invention broadcast key distribution system that are performed at initialization or assembly of the receivers.

FIG. 4 illustrates initial processing steps 300 performed by the embedment of the present invention for broadcasting an encrypted message C and decryption of that message by authorized receivers within the network 40. FIG. 4 illustrates that each receiver unit of network 40 must have a private encryption key, k(i), and a prime number, p(i), that does not necessarily need to be secret. The process 300 begins at 305 where private encryption keys, k(i), are generated for each receiver in the network 40. This step may be performed in any of a number of well known and conventional manners and can be accomplished at the site where the receiver units are fabricated. The values, k(i), can be determined before the receiver is inserted into the network 40 or after. Block 310 illustrates an embodiment wherein the values, k(i), are transmitted to each unit of network 40 upon network initialization. The manner of transmission or insertion is not critical. Also, at step 315, a prime number is generated for each receiver of network 40 and transmitted to that receiver similarly. Block 315 may be performed at system initialization or fabrication. Is it appreciated that regardless of how or when the private encryption keys, k(i), and prime numbers, p(i), are given to each receiver, the transmitter 10 must be informed of the value of each private key, k(i), and the value of each prime, p(i), within the network. The prime numbers can be pair-wise relatively prime and the smallest prime is to be larger the total number of receiver units within the network 40. The private keys, k(i), are kept secret but the primes, p(i), need not be secret.

Figure 5:
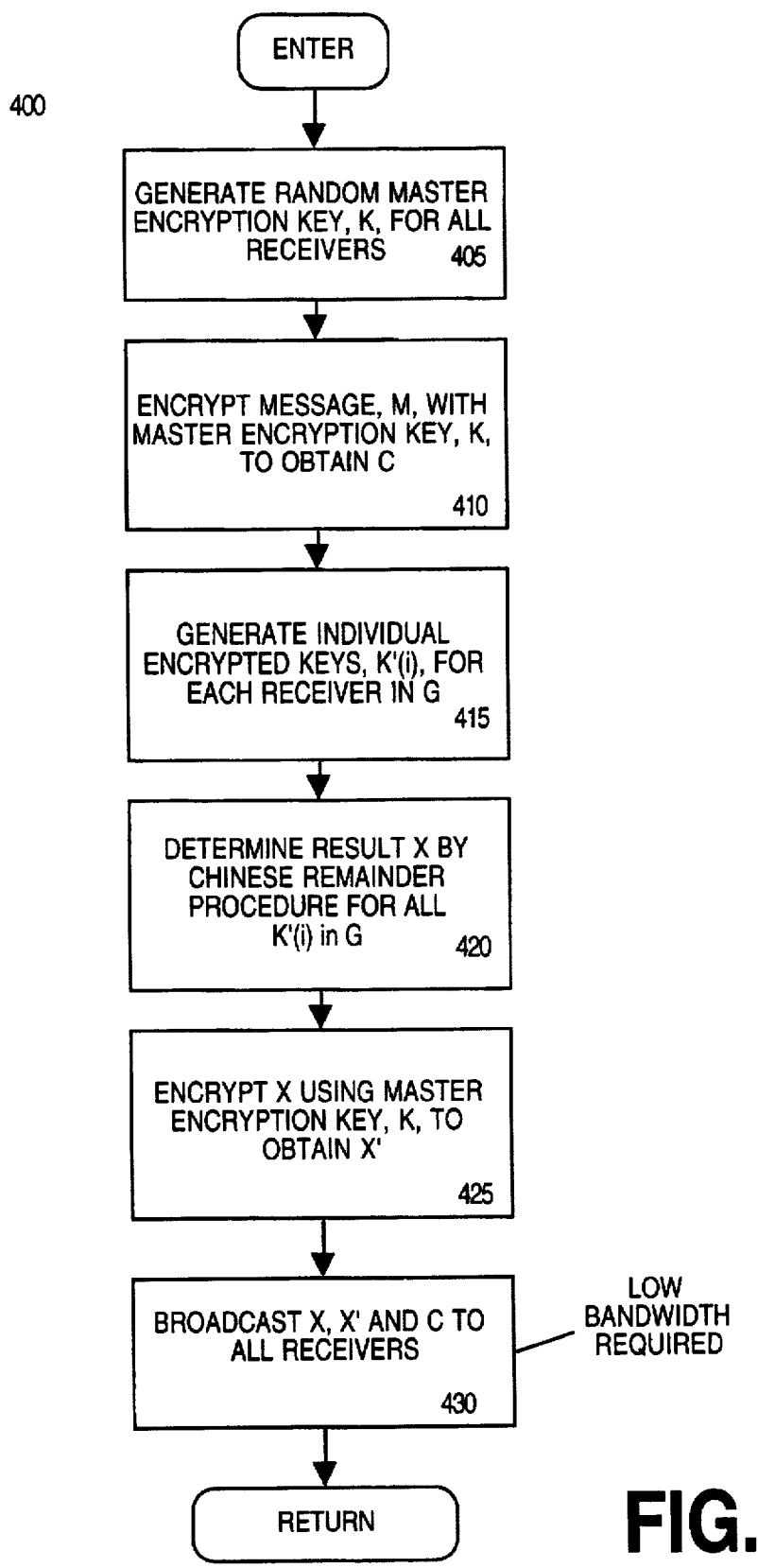
FIG. 5 is a flow diagram illustrating steps of the present invention broadcast key distribution system that are performed at the information transmitter for transmitting an encoded message and encoded master key.

FIG. 5 illustrates the processing flow 400 the present invention performed by and implemented within the transmitter 10 of the network 40. At block 405, the transmitter unit 10 generates a master encryption key, K, for all receiver units. The generation and character of the key, K, may be of a conventional nature and the process used can be based on a random procedure. At block 410, the transmitter 10 encrypts a message, M, with the master key, K, to obtain a cipher message C. The encryption procedure utilized at block 410 may be of a convention method. The expression below illustrates the procedure executed at 410 to generate the cipher message, C:

$C = E_K(M)$

It is appreciated that block 410 may occur at any stage of process 400 after block 405 and before block 430 and its placement within FIG. 5 is exemplary.

At block 415, the transmitter 10 of the present invention generates individual encrypted master keys, K'(i), for each authorized receiver of the network 40 based on the private keys, k(i), of each receiver known by the transmitter 10 within the group G. These encrypted master keys, K'(i), represent the master key, K, encrypted by each individual private key, k(i), within group G according to the below process:

$K'(i) = E_k(i)(K)$

The present invention then stores these encrypted master keys within memory 102.

At block 420, the present invention utilizes the Chinese Remainder procedure to compute X which satisfies the below formulas (one formula for each authorized receiver within G):

$X = K'(1) \bmod (p(1))$ $X = K'(2) \bmod (p(2))$ $X = K'(3) \bmod (p(3))$ $X = K'(4) \bmod (p(4)) \ldots$ $X = K'(n) \bmod (p(n))$, where n is the number of authorized receivers within subset G.

The prime numbers associated with each receiver are p(i). The encrypted master key for each receiver is K'(i). According to the Chinese Remainder procedure, as discussed above, there is only one solution for X that will satisfy all of the above formulas for the receivers within the subset G. The present invention transmitter unit 10 solves the above relationship according to the Chinese Remainder procedure to determine the unit value X at block 420. Once X is determined, it is stored in memory 102.

At block 425, the present invention encrypts X using the master encryption key, K, to obtain X'. The encryption at block 425 may be of a number of well known encryption techniques and is not critical to aspects of the present invention. At block 430, the transmitter unit 10 performs the transmission phase by broadcasting X, X' and C to all of the receivers of the network 41). The transmission first broadcasts X and X' and subsequently broadcasts C. As shown at block 430, this is a low bandwidth transmission requirement since only X and X' need be broadcast and not each and every K'(i) as required by the prior an systems. As shown above in block 420, the individual K'(i) values and the primes for each authorized receiver are used by the present invention in order to compute X.

Figure 6:
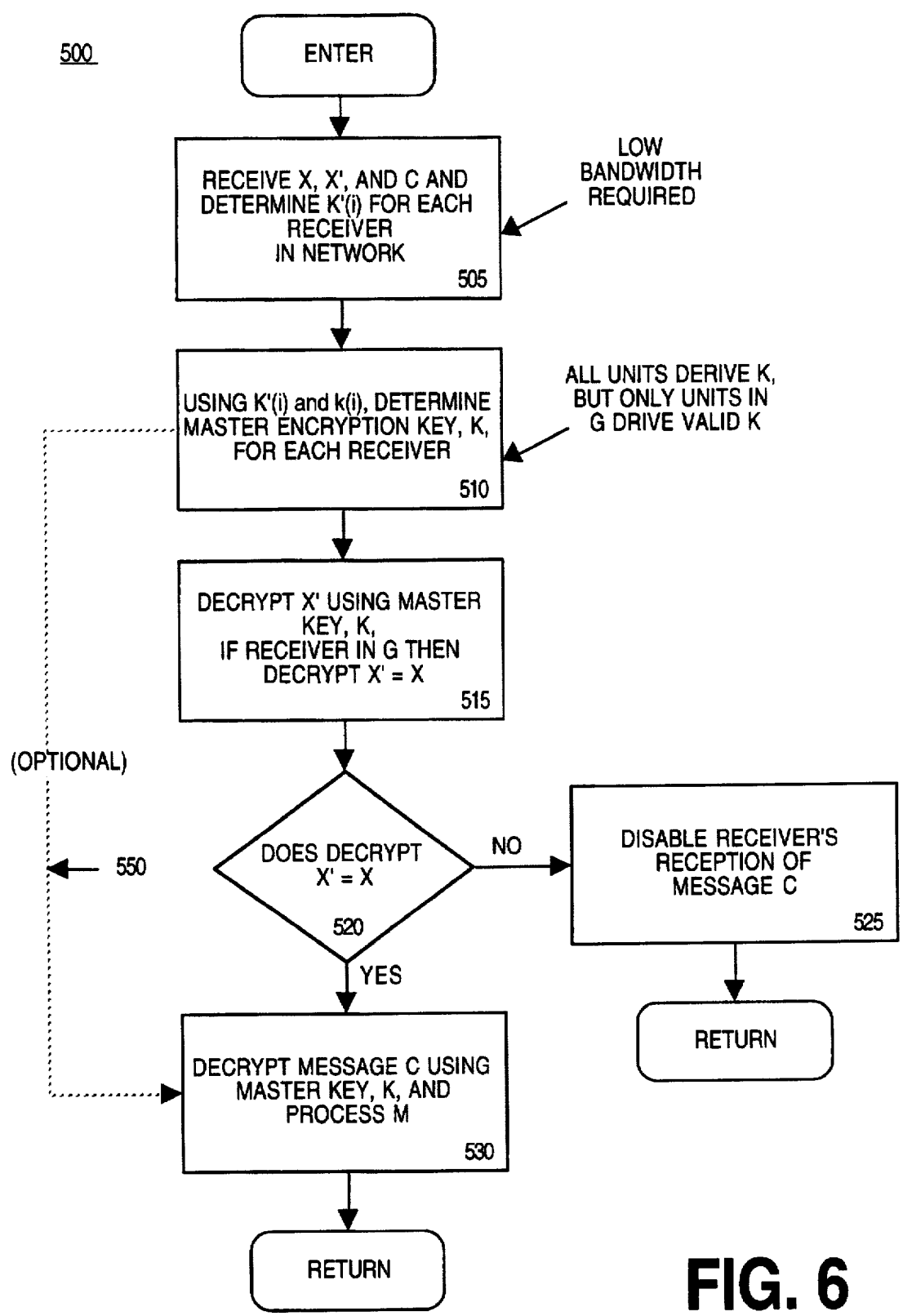
FIG. 6 illustrates steps of the present invention broadcast key distribution system that are performed individually by each receiver unit of the system for reception of an encoded message.

Refer to FIG. 6 which illustrates the processing 500 performed by each receiver unit of the present invention within network 40 in response to the processing 400 of the transmitter 10. At block 505, each receiver of network 40 receives X, X', and C over the network communication lines. As discussed previously, this is a low bandwidth transmission because separate encoded master keys are not transmitted for each receiver, as is required in the prior art.

Also at block 505, each receiver unit of the network 40 uses the received X to determine its K'(i) according to the following relationship:

$$K'(i) = X \bmod (p(i))$$

K'(i) is then stored in memory within each receiver unit. According to the present invention, a valid K'(i) will be determined only for those authorized receivers within the subset G. The Chinese Remainder procedure used to compute X in block 420 solves X only for authorized receivers. The value X will not solve the above equation for unauthorized primes. The other receivers of network 40 (not in G) will not derive a valid K'(i) at block 505.

At block 510, each authorized receiver in the network 40 uses K'(i) and its private key, k(i), to determine the master encryption key, K, according to the following relationship:

$$K = D_{k(i)}(K'(i))$$

K is stored in memory for each receiver. Again, only those receivers in the subset G will obtain a valid K'(i) and therefore only those authorized receivers will derive a value master key, K.

The present invention flow 500 also contains optional unauthorized receiver disablement processing which includes blocks 515, 520 and 525. These blocks are optional within one embodiment of the present invention. If this feature is not desired, processing may continue from block 510 directly to block 530 as shown via the optional pathway 550.

Under the optional disablement embodiment, processing flows from block 510 to block 515 where each receiver in the network 40 utilizes the master key, K, to decrypt X' using the below relationship:

$$X? = D_K(X')$$

Only authorized receivers are able to determine a valid K, therefore only authorized receivers will determine a valid X? from the above decryption. Since the transmitter 10 broadcast the value of X, each receiver can compare the result of the above computation to determine if X? does equal the broadcast X. This determination is performed at 520. For a given receiver, if X? does not equal the broadcast X, then at block 525, the receiver unit will disable its reception of the encrypted message C as it could not produce a valid key, K. Processing will then end for processing 500.

For a particular receiver unit, if X? does equal the broadcast X, then the receiver computed a valid K and is authorized and processing flows to block 530 where the receiver is allowed to receive the encrypted message, C, and uses the master key, K, to decrypt the message to obtain M as shown below:

$$M = D_K(C)$$

As stated above, the communication network 40 may be a television or video or other entertainment media network in which case the message M will be displayed on a typical visualization media, such as an analog or digital monitor. Communication networks 40 that are computer systems will process the message M in conventional fashion.

Assuming the optional path 550 is taken from block 510 directly to block 530, then unauthorized receivers are allowed to receive the message C. However, since they have an invalid master key, K, they are unable to properly decrypt the message, C, to obtain a valid message M. What results from the above decryption of C is a garbage or invalid message that will not be processed or visualized properly.

LOGICAL PROCESSING OF THE PRESENT INVENTION FOR BROADCAST/RECEPTION OF NEW PRIVATE KEYS

Figure 7:
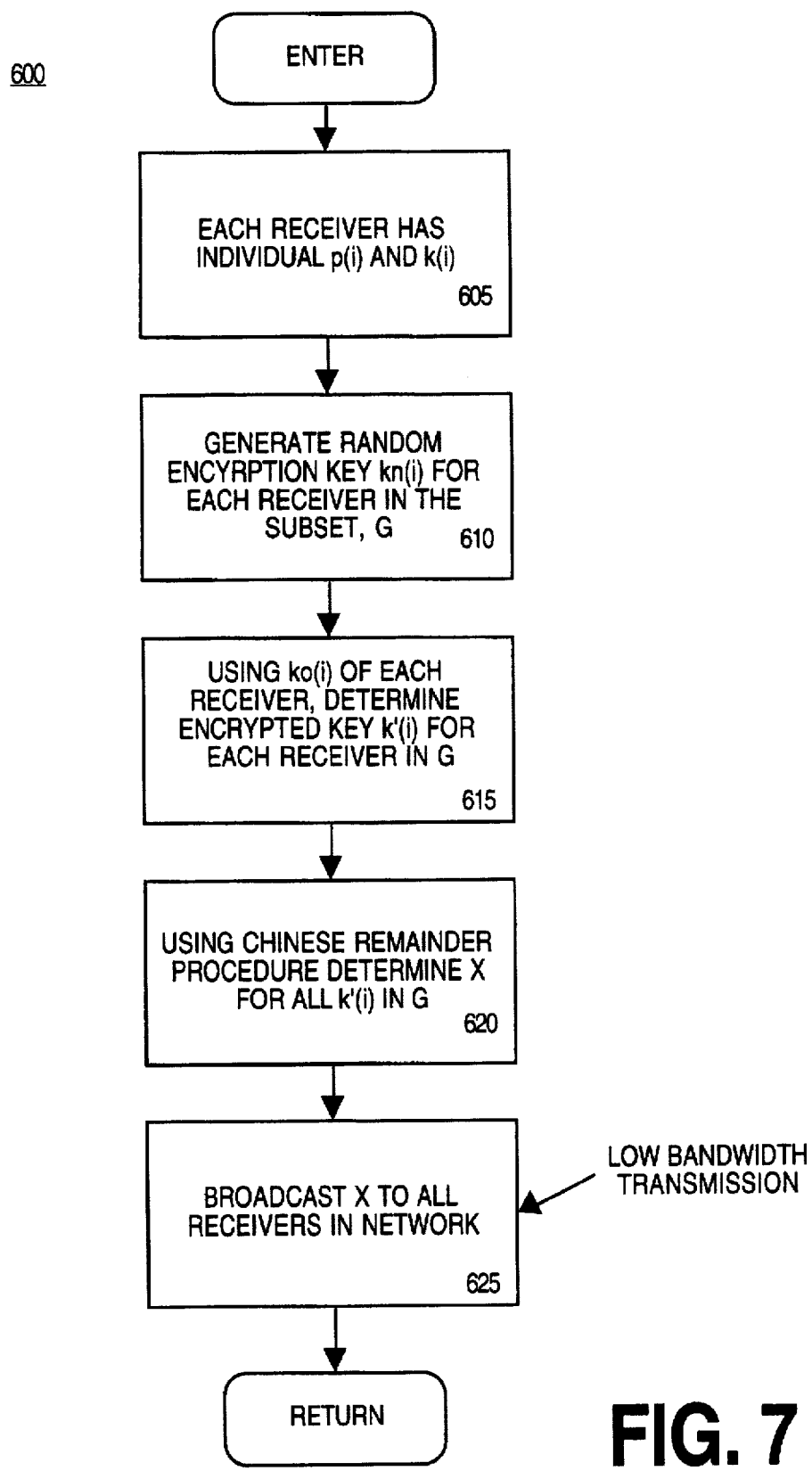
FIG. 7 illustrates steps of the present invention broadcast key distribution system that are performed at the information transmitter for distributing new keys to a group of receiver units.

The present invention use of the Chinese Remainder procedure may be generalized to include the broadcasting and selective reception of new or replacement private keys for the authorized receivers or for all receivers assuming the set of authorized receivers encompasses all receivers 20–38 within the network 40. FIG. 7 illustrates processing 600 performed by the transmitter 10 in order to broadcast new private keys, kn(i), to the subset G of authorized receivers. At block 605, the initial conditions required under the present invention are shown. Each receiver unit 20–38 within the network 40 contains a prime number p(i) and an individual secret private key, k(i). Since these k(i), for the authorized receivers, will be replaced, they will be referred to as the old private keys and designated as ko(i). The transmitter 10 is aware of each private key, ko(i), and is aware of each prime number, p(i), for each receiver in the network.

At block 610, the present invention transmitter 10 generates a random (or via another suitable conventional method) private encryption key, kn(i), for each authorized receiver within the network 40. These are the new set of keys that will replace the old set for the receivers within G. The generated set of new keys, kn(i), are then stored in memory 102. At block 615, the transmitter 10 utilizes the current private keys, ko(i), of each authorized receiver of subset G to generate a separate encrypted private key, k'(i), for each authorized receiver unit as shown below:

$$k'(i) = E_{ko(i)}(kn(i))$$

Each of the encrypted new private keys, k'(i), is then stored in memory 102 within transmitter 10.

At block 620, the transmitter 10 utilizes the Chinese Remainder procedure to solve the set of equations (shown below), one equation for each authorized receiver, so that a unique X is determined:

X = k'(1) mod (p(1))

X = k'(2) mod (p(2))

X = k'(3) mod (p(3))

X = k'(4) mod (p(4))

X = k'(n) mod (p(n)), where n is the number of authorized receivers in network 40. The above equations utilize the prime numbers, p(i), associated with each authorized receiver and also the encrypted new private key, k'(i), associated with each authorized receiver. Once X is determined, it is stored in memory 102. At block 625, the transmitter 10 broadcasts X to all units in the network 40.

Figure 8:
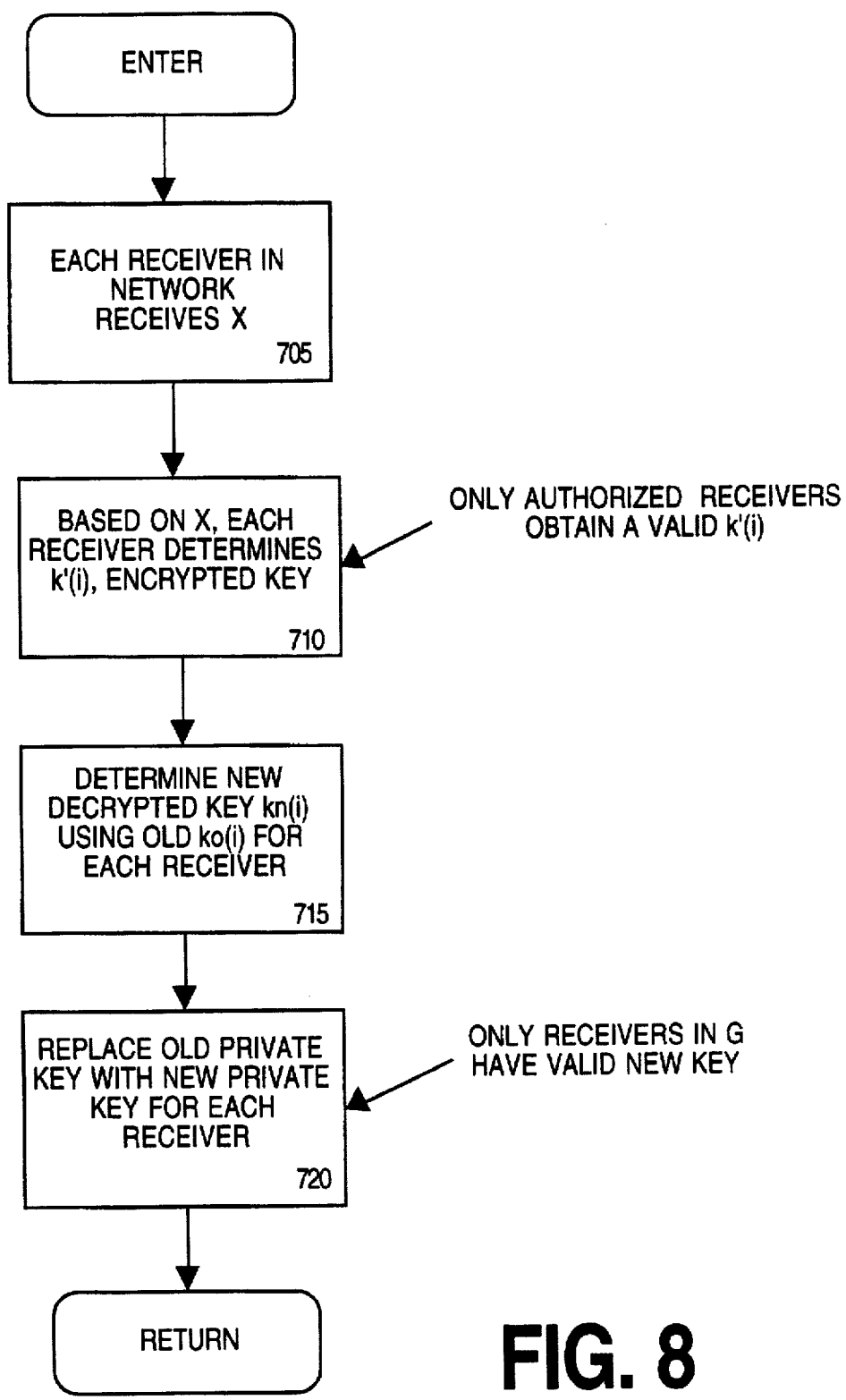
FIG. 8 illustrates steps of the present invention verified broadcast key distribution system that are performed individually by each receiver unit of the system for reception of an encoded message.

FIG. 8 illustrates the processing 700 performed by each receiver of network 40 upon reception of X from the transmitter 10. At 705, each receiver unit of network 40 receives X. At block 710, based on the received X value and its own associated prime number, each receiver unit determines a k'(i) encrypted key according to the below relationship:

$$k'(i) = X \bmod (p(i))$$

However, only authorized receiver units will be able to determine a valid k'(i). According to the present invention, the value X will not solve the above equation for unauthorized primes. After k'(i) is determined, it is decrypted by a given receiver using the current private key of the receiver as shown below:

$$kn(i) = D_{ko(i)}(k'(i))$$

Since only authorized receivers will determine a valid k'(i), only authorized receivers will determine a valid new private encryption key, kn(i). The remainder receivers (not in subset G) will compute garbage or invalid new keys. If the subset G encompasses all of the receivers of the network 40, as may be a common case, then all of the receivers in the network 40 will receive a valid and new private key, kn(i).

At block 720 of the present invention, the authorized receivers will replace (in memory) their current private encryption key, ko(i), with the newly determined private encryption key, kn(i). Unauthorized receivers within the network, if any, will replace their current key with an invalid key. The newly received private encryption keys, kn(i), can then be used, such as by processing 300, 400, and 500 of the present invention for message broadcast/reception. Therefore, the present invention provides for coded broadcast of new private keys to all receivers in G by the low bandwidth transmission of X.

LOGICAL PROCESSING OF THE PRESENT INVENTION FOR VERIFIED BROADCAST/ RECEPTION OF NEW PRIVATE KEYS

Figure 9:
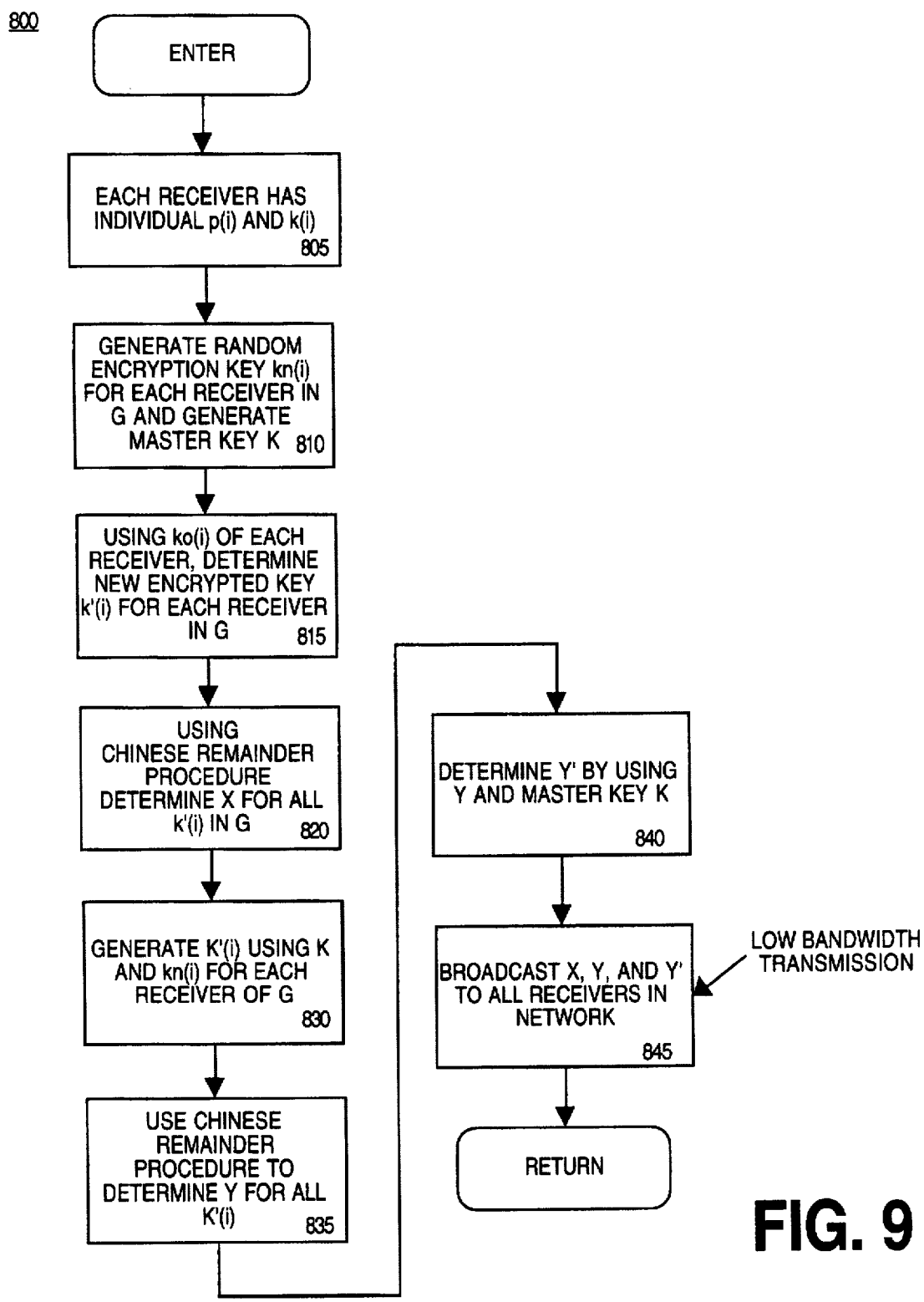
FIG. 9 illustrates steps of the present invention verified broadcast key distribution system that are performed at the information source for distributing new keys to a group of receiver units.
Figure 10:
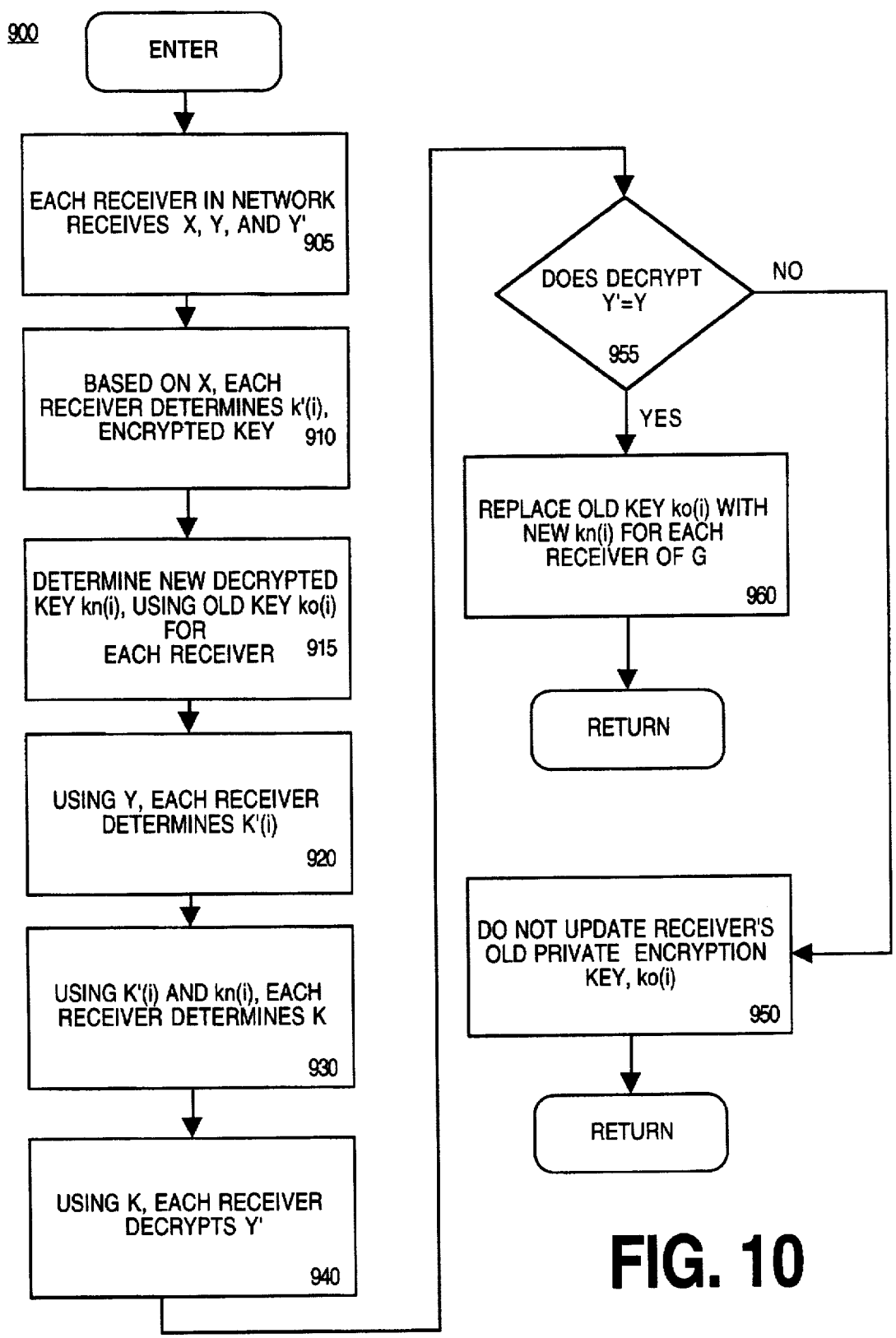
FIG. 10 illustrates steps of the present invention verified broadcast key distribution system that are performed individually at the receiver unit for receiving newly distributed keys.

The processes of FIG. 9 and FIG. 10 of the present invention illustrate broadcast of new private keys to authorized receivers but perform a verification such that only the authorized receivers within subset G replace their current private keys with the new private keys. This is advantageous for targeting only a particular group of receivers for private key updating while not modifying the private keys of other receivers of network 40.

Refer to FIG. 9 which illustrates the processing 800 carried by the transmitter 10 for this embodiment of the present invention. At block 805, the initial conditions required under the present invention are shown. Each receiver within the network 40 contains an individual prime number p(i) and an individual secret private key, k(i). Since these keys, k(i), for the authorized receivers, will be replaced, they will be referred to as the old private keys and designated as ko(i). The transmitter 10 is aware of each private key, ko(i), and is aware of each prime number, p(i), for each receiver in the network 40.

At block 810, the transmitter 10 generates a random (or via any conventional routine or method) new encryption key, kn(i), for each authorized receiver within a subset of receivers, G. At block 810, the present invention also generates a master key, K. Each key generated at block 810 is saved into memory 102 of the transmitter. At block 815, using the current private key, kn(i), for each receiver, the transmitter 10 determines an encrypted new private key, k'(i), for each receiver in the network according to the below relationship:

$$k'(i) = E_{ko(i)}(kn(i))$$

Each of the encrypted new private keys, k'(i), are stored in memory 102.

At block 820, the present invention utilizes the Chinese Remainder procedure to determine a unique X that satisfies the following equations for each authorized receiver within the subset, G:

k'(1)=X mod (p(1))
k'(2)=X mod (p(2))
k'(3)=X mod (p(3))
k'(4)=X mod (p(4)) . . .
k'(n)=X mod (p(n)), where n is number of authorized receivers within the subset G The value p(i) is the individual prime number associated with each authorized receiver unit in G. The value k'(i) is the value of each encrypted new private key for each authorized receiver unit in G. The transmitter then stores X into memory 102.

At block 830, the transmitter utilizes the new private keys, kn(i), for each receiver of the authorized subset G and encrypts the master key, K, to obtain a separate encrypted master key, K'(i) for each authorized receiver according to:

$$K'(i) = E_{kn(i)}(K)$$

At block 835, the present invention utilizes the Chinese Remainder procedure to solve for a unique Y that satisfies the below equations, one for each authorized receiver:

K'(1)=Y mod(p(1))
K'(2)=Y mod(p(2))
K'(3)=Y mod(p(3))
K'(4)=Y mod(p(4)) . . .
K'(n)=Y mod(p(n)), where n is the number of receivers within the subset G Y is saved to memory 102. K'(i) being the encrypted master key for each authorized receiver and p(i) being the prime associated with each authorized receiver of the network 40. At block 840, the transmitter 10 encrypts Y using the master key, K, to obtain Y' according to:

$$Y' = E_K(Y)$$

The transmitter 10 then saves Y' to memory at block 845, the present invention transmitter 10 then broadcasts X, Y, and Y' to all receivers within the network 40. The transmission at block 845 is a low bandwidth transmission because only three values are transmitted over the network 40. However, with this information, as will be shown below, all receivers within G will obtain a new private encryption key.

FIG. 10 illustrates the processing 900 performed by the present invention by each receiver unit of the network 40 in response to processing 800. At 905, each receiver unit receives X, Y and Y' from the network. At 910, each receivers utilizes its prime number, p(i), and the broadcast value, X, to determine the encrypted new private key, k'(i), according to the below relationship:

$$k'(i) = X \mod (p(i))$$

The value of k'(i), is then saved in the receiver's memory 102. Only authorized receivers within the subset G will obtain a valid encrypted private key, k'(i) as a result of the above. At block 915, each receiver then determines the new private key by decrypting the encrypted new private key using the current private encryption key, ko(i), by:

$$kn(i) = D_{ko(i)}(k'(i))$$

The value d kn(i) is then saved to memory. Only authorized receivers within G will obtain a valid new private encryption key, kn(i).

At block 920, each receiver of the network 40 then uses Y and its prime number, p(i), to determine the encrypted value of the master key, K'(i), according to:

$K'(i) = Y \bmod (p(i))$

Only authorized receivers will determine a valid K'(i). At block 930, the present invention receivers then utilize their new private encryption keys, kn(i), obtained from block 915, to determine the master key, K, according to:

$K = D_{kn(i)} (K'(i))$

Only authorized receivers will compute a value K. Once the master key, K, is determined for each receiver, the receiver computes (at block 940) the decrypted value of the broadcast value Y' according to:

$Y? = D_K (Y')$

At block 940, the present invention receivers that are part of the authorized subset G will determine Y? such that Y? equals the broadcast value of Y. At block 955, each receiver compares its computed Y? value to the received value of Y. If they are equal, then this receiver is part of the authorized subset, G, and at block 960, it replaces its old private key, ko(i), with the new private key, kn(i).

At block 955, if for a particular receiver the value Y? does not equal the broadcast value of Y, then that receiver is not part of the authorized group of receivers to get a new private key. Then, at block 950, the old private key, ko(i), for these receivers is not altered and the value computed in block 915 for this receiver is garbage and is ignored.

The preferred embodiment of the present invention, a broadcast message mechanism having low bandwidth requirements but offering the security protection of private keys for each receiver, is thus described. While the present invention has been described in particular embodiments, it should be appreciated that the present invention should not be construed as limited by such embodiments, but rather construed according to the below claims.

What is claimed is:

1. An apparatus for performing network communication, said apparatus comprising:
   a plurality of receiver units individually having a prime value and a private key;
   transmitter processing logic for selecting a subset of said plurality of receiver units, said subset comprising at least two of said plurality of receiver units, said transmitter processing logic also individually encrypting a master key, K, with each private key of said subset of receiver units;
   wherein said transmitter processing logic is also for solving a set of relationships that contain values associated with said subset of receiver units wherein a single value, X, solves each relationship; and
   broadcast processing logic coupled to communicate with said transmitter processing logic for transmitting said single value, X, to each receiver unit of said plurality of receiver units.

2. An apparatus as described in claim 1 wherein said transmitter processing logic encrypts said master key, K, with each private key of said subset of receiver units to generate an encrypted master key for each receiver unit of said subset and wherein said set of relationships includes an individual prime value, an individual encrypted master key, and said single value X for each receiver unit of said subset.

3. An apparatus as described in 2 wherein said transmitter processing logic utilizes the Chinese Remainder procedure to solve said set of relationships to determine said single value X.

4. An apparatus as described in claim 1 wherein said set of relationships associated with said subset comprise:

$K'(i) = X \bmod (p(i))$ $(i=1 \text{ to } n)$, wherein n is the number of receiver units within said subset, p(i) is said prime value for a receiver unit, i, of said subset and K'(i) is said encrypted master key of said receiver unit, i, of said subset.

5. An apparatus as described in claim 1 wherein an individual receiver unit of said plurality of receiver units comprises:
   receiver processing logic for receiving said single value, X, from said broadcast processing logic;
   computation processing logic for computing an encrypted master key associated with said individual receiver unit, said encrypted master key computed based on a prime value and a private key associated with said individual receiver unit; and
   key decryption processing logic for decrypting said encrypted master key of said individual receiver unit based on said private key of said individual receiver unit to obtain said master key, K.

6. An apparatus as described in claim 5 wherein said computation processing logic computes said encrypted master key according to:

$K'(i) = X \bmod (p(i))$, wherein K'(i) is said encrypted master key for said individual receiver unit, i, and p(i) is said prime value for said individual receiver unit, i.

7. An apparatus as described in claim 5:
   wherein said transmitter processing logic comprises encryption processing logic for encrypting a message using said master key, K, to obtain a cipher message and said broadcast processing logic is also for broadcasting said cipher message; and
   wherein said individual receiver unit of said plurality of receiver units comprises message decryption processing logic for decrypting said cipher message with said master key to obtain said message.

* * * * *